United States Patent
Huang (10) Patent No.: US 12,468,803 B2
(45) Date of Patent: Nov. 11, 2025

(54) CONTROL CIRCUIT UNIT, ELECTROMAGNETIC DETECTION METHOD AND DIGITAL CIRCUIT DESIGN METHOD

(71) Applicant: PHISON ELECTRONICS CORP., Miaoli (TW)

(72) Inventor: Rui-Chang Huang, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 184 days.

(21) Appl. No.: 18/420,743

(22) Filed: Jan. 23, 2024

(65) Prior Publication Data

US 2025/0225235 A1    Jul. 10, 2025

(30) Foreign Application Priority Data

Jan. 4, 2024   (TW) .................................. 113100478

(51) Int. Cl.
G06F 21/55        (2013.01)
(52) U.S. Cl.
CPC ...... *G06F 21/554* (2013.01); *G06F 2221/034* (2013.01)
(58) Field of Classification Search
CPC .... G06F 21/554; G06F 21/552; G06F 21/556; G06F 21/75; G06F 2221/034; G06F 2207/7219
See application file for complete search history.

(56) References Cited

U.S. PATENT DOCUMENTS

| | | | |
|---|---|---|---|
| 2011/0029828 A1* | 2/2011 | Bancel | G06F 1/10 714/724 |
| 2011/0119532 A1* | 5/2011 | Teglia | H04L 9/06 714/E11.203 |
| 2011/0267094 A1* | 11/2011 | La Rosa | G11C 11/417 327/566 |
| 2018/0181492 A1* | 6/2018 | Gupta | G06F 11/34 |

(Continued)

FOREIGN PATENT DOCUMENTS

| | | |
|---|---|---|
| CN | 101382978 | 3/2009 |
| CN | 116110202 | 5/2023 |

OTHER PUBLICATIONS

"Office Action of Taiwan Counterpart Application", issued on Jul. 30, 2024, pp. 1-7.

*Primary Examiner* — Tod R Swann
*Assistant Examiner* — Amir Mahdi Hajiabbasi
(74) *Attorney, Agent, or Firm* — JCIPRNET (57) ABSTRACT

A control circuit unit includes: a target circuit unit, a plurality of detection circuit units, a plurality of local counters, a global counter, and a management circuit unit. The detection circuit units are disposed in a plurality of local areas of a target area within the control circuit unit, and the target area encompasses the target circuit unit. The detection circuit unit is used to send a first signal in response to a determination of receiving an external electromagnetic attack. The plurality of local counters update the number of recorded localized attack in response to receiving the first signal. The global counter accumulates the number of localized attacks to update the number of recorded globalized attacks. The management circuit unit issues a warning notification based on the number of globalized attacks and the number of localized attacks of each local counter.

23 Claims, 7 Drawing Sheets

(56) References Cited

U.S. PATENT DOCUMENTS

2019/0050565 A1\* 2/2019 Maghrebi ............... G06F 21/55
2021/0232679 A1\* 7/2021 Hershman ............... G06F 21/77
2022/0051716 A1\* 2/2022 Ayyapureddi ...... G06F 13/1636

\* cited by examiner

The values of all of the local counters are increased stably — T51

|      | T1 | T2 | T3 | T4 | T5 | T6 |
|------|----|----|----|----|----|----|
| LC(1)| 3  | 4  | 5  | 6  | 7  | 8  |
| LC(2)| 3  | 4  | 5  | 6  | 7  | 8  |
| LC(3)| 3  | 4  | 5  | 6  | 7  | 8  |
| LC(4)| 4  | 5  | 6  | 7  | 8  | 9  |

⇒ Determined as a natural electromagnetic interference (not electromagnetic attack from a hacker)

Only the values of some of the local counters are increased stably — T52

|      | T1 | T2 | T3 | T4 | T5 | T6 |
|------|----|----|----|----|----|----|
| LC(1)| 3  | 4  | 5  | 6  | 7  | 8  |
| LC(2)| 0  | 1  | 1  | 1  | 1  | 1  |
| LC(3)| 0  | 0  | 0  | 0  | 0  | 0  |
| LC(4)| 0  | 0  | 0  | 0  | 0  | 0  |

⇒ Determined as man-made electromagnetic interference (electromagnetic attack from a hacker)

FIG. 5

CONTROL CIRCUIT UNIT, ELECTROMAGNETIC DETECTION METHOD AND DIGITAL CIRCUIT DESIGN METHOD

CROSS-REFERENCE TO RELATED APPLICATION

This application claims the priority benefit of Taiwan application no. 113100478, filed on Jan. 4, 2024. The entirety of the above-mentioned patent application is hereby incorporated by reference herein and made a part of this specification.

BACKGROUND

Field of the Disclosure

The present disclosure relates to a detection method, and in particular to an electromagnetic detection method, a control circuit unit using the electromagnetic detection method and a digital circuit design method of the corresponding control circuit unit.

Description of Related Art

Generally speaking, hackers may attack the host system or controller through network connections, data connections, and communication connections in an attempt to gain control, crack the security mechanism, or steal data.

However, with the advancement of password verification technology, it is getting difficult to effectively crack the security mechanism through the above methods. Gradually, hackers adopt physical electromagnetic energy to attack host systems or controllers in an attempt to interfere with the normal operation of the above-mentioned electronic devices through external electromagnetic energy, and thus creating/finding vulnerabilities in the security mechanism.

SUMMARY OF THE DISCLOSURE

The present disclosure provides a control circuit unit, an electromagnetic detection method and a digital circuit design method that may effectively detect external electromagnetic attacks and issue corresponding warning notifications to ensure the overall safety of the system.

An exemplary embodiment of the present disclosure provides a control circuit unit for detecting external electromagnetic attacks. The control circuit unit includes one or more target circuit units, a plurality of detection circuit units, a plurality of local counters, a global counter, and a management circuit unit. The detection circuit units are respectively disposed in a plurality of local areas of a target area within the control circuit unit, wherein the target area encompasses the one or more target circuit units. The detection circuit units are used to send a first signal in response to a determination of receiving an electromagnetic attack. The local counters respectively correspond to the local areas, wherein the local counters are coupled to the detection circuit units belonging to the corresponding local areas, and update the number of recorded localized attacks in response to receiving the first signal, wherein the number of each localized attack reflects the total number of electromagnetic attacks on the corresponding local area. The global counter corresponds to the target area and is coupled to the local counters, and accumulates the number of localized attacks recorded by all of the coupled local counters to update the number of recorded globalized attacks, wherein the number of globalized attacks reflects the total number of the electromagnetic attack on the target area. The management circuit unit issues a warning notification based on the number of globalized attacks and the number of localized attacks.

Another exemplary embodiment of the present disclosure provides an electromagnetic detection method for detecting external electromagnetic attacks and adaptable for a control circuit unit. The control circuit unit includes: one or more target circuit units, a plurality of detection circuit units, a plurality of local counters, a global counter and a management circuit unit. The detection circuit units are respectively disposed in a plurality of local areas of a target area within the control circuit unit, wherein the target area encompasses the one or more target circuit units. Each local counter is coupled to the detection circuit units belonging to the corresponding local area, wherein the global counter is coupled to the local counters, and wherein the disposed management circuit unit is coupled to the global counter and the local counters. The method includes: sending a first signal by each detection circuit unit in response to a determination of receiving the electromagnetic attack; updating the number of recorded localized attacks by each local counter in response to receiving the first signal, wherein the number of each localized attack reflects the total number of electromagnetic attacks on the corresponding local area; accumulating the number of localized attacks recorded by all of the coupled local counters by the global counter to update the number of recorded globalized attacks, wherein the number of globalized attacks reflects the total number of the electromagnetic attack on the target area; and issuing a warning notification by the management circuit unit based on the number of globalized attacks and the number of localized attacks of each local counter.

Another exemplary embodiment of the present disclosure provides a digital circuit design method, which is adaptable for designing a control circuit unit for detecting external electromagnetic attacks. The method includes: disposing one or more target areas in one or more target circuit units within the control circuit unit; disposing a plurality of detection circuit units respectively in a plurality of local areas of the target area, wherein each detection circuit unit is used to send a first signal in response to a determination of receiving an electromagnetic attack; disposing a plurality of local counters respectively corresponding to the local areas, wherein each local counter is coupled to the detection circuit units belonging to the corresponding local areas, each local counter is used to record the number of localized attacks in the corresponding local area according to the received first signal, wherein the number of each localized attack reflects the total number of electromagnetic attacks on the corresponding local area; disposing a global counter corresponding to the target area so as to be coupled to the local counters and to record the number of globalized attacks of the target area, wherein the number of globalized attacks reflects the total number of the electromagnetic attack on the target area; and disposing a management circuit unit coupled to the global counter and the local counters, wherein the management circuit unit issues a warning notification based on the number of globalized attacks and the number of localized attacks of each local counter.

Based on the above, the control circuit unit, electromagnetic detection method and digital circuit design method provided in this exemplary embodiment may effectively perform detection of electromagnetic attacks through the designed control circuit unit, wherein the detection circuit unit disposed in the target area of the target circuit unit may detect the electromagnetic attack exerted on the target circuit unit and then issue a warning notification accordingly. In this way, the host system may be immediately notified of the currently undergone electromagnetic attack, so that the host system may perform security operations accordingly, thereby improving the security efficiency of the host system.

DESCRIPTION OF EMBODIMENTS

Figure 1A:
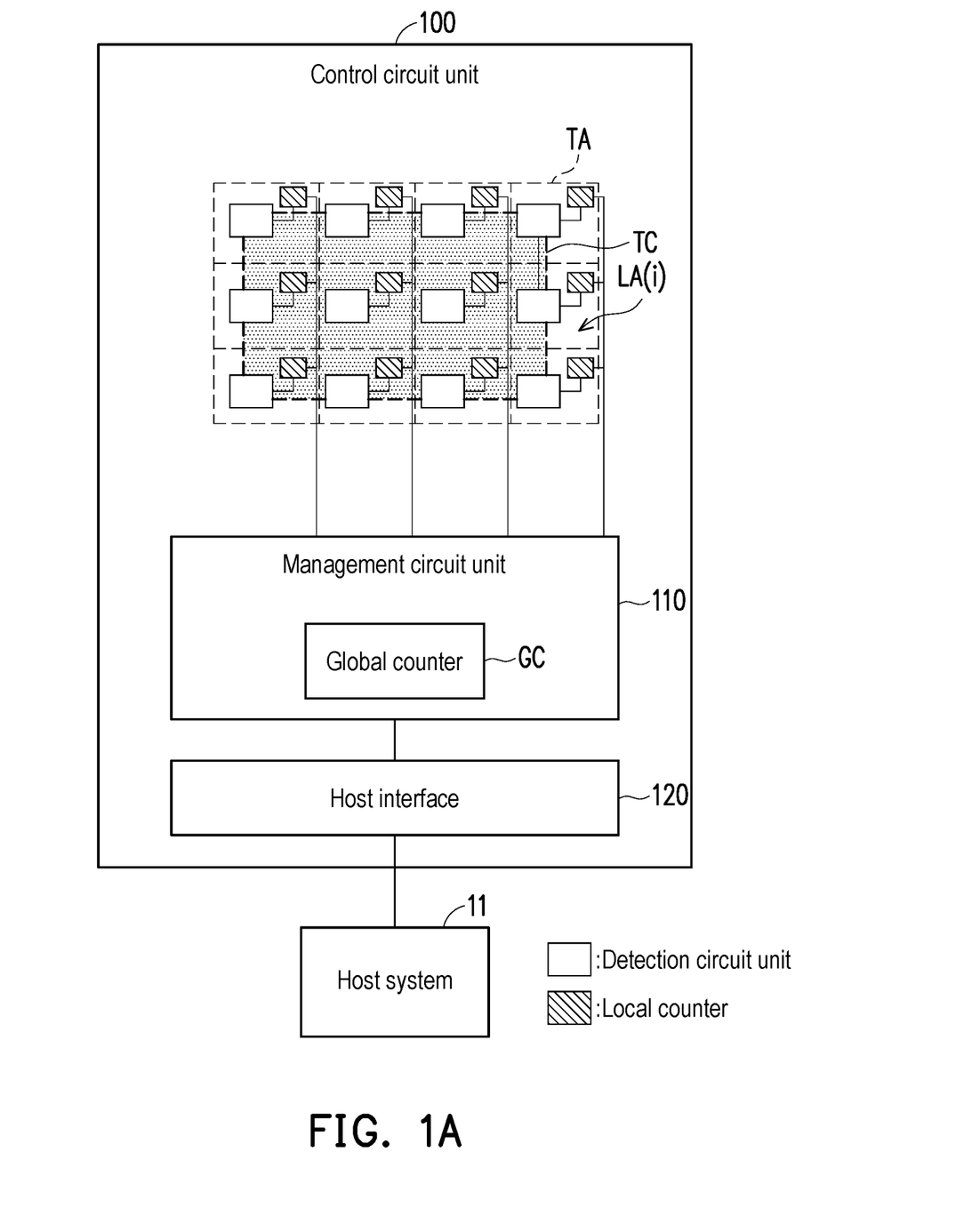
FIG. 1A is a block diagram of a control circuit unit according to an exemplary embodiment of the present disclosure.

FIG. 1A is a block diagram of a control circuit unit according to an exemplary embodiment of the present disclosure.

Please refer to FIG. 1. In this exemplary embodiment, the control circuit unit 100 includes: one or more target circuit units TC, a plurality of detection circuit units, a plurality of local counters, a global counter GC, a management circuit unit 110 and a host interface 120. In an embodiment, the control circuit unit 100 is disposed in a storage device coupled to the host system 11, and may further be disposed to control the overall operation of the storage device. The storage device may be disposed within the host system 11 or externally connected to the host system 11. The host system 11 is, for example, an on board unit (OBU) or a central control device of a vehicle. In another embodiment, the host system 11 is, for example, a personal computer, a notebook computer, a smart portable device or a server.

The plurality of detection circuit units are respectively disposed in a plurality of local areas LA(i) of the target area TA in the control circuit unit 100, wherein the target area TA encompasses one or more target circuit units, each detection circuit unit is used to send a first signal in response to a determination of receiving an electromagnetic attack. In other words, the outer boundaries of the detection circuit units encompassing a target circuit unit may be connected to form a range corresponding to the target area, and the range will be larger than and encompass the occupied area of the target circuit unit.

The one or more target circuit units are circuit units under major protection. In an exemplary embodiment, the one or more target circuit units are, for example, at least one of the following: a processor, an encryption circuit, a decryption circuit, and a buffer memory (or other types of storage circuit units).

The local counters respectively correspond to the local areas LA(i), wherein each local counter is coupled to one or more detection circuit units belonging to the corresponding local area, and is used to update the number of recorded localized attacks in response to receiving the first signal, wherein the number of each localized attack reflects the total number of electromagnetic attacks on the corresponding local area.

The global counter GC corresponds to the target area TA, is coupled to the local counters, and is used to accumulate the number of localized attacks recorded by all of the coupled local counters to update the number of recorded globalized attacks, wherein the number of globalized attacks reflects the total number of electromagnetic attacks on the target area.

The management circuit unit 110 is coupled to the global counter and the local counters, wherein the management circuit unit 110 issues a warning notification according to the number of globalized attacks and the number of localized attacks of each local counter. In this exemplary embodiment, the management circuit unit 110 sends the warning notification to the host system 11 coupled to the control circuit unit 100 or a processor of the control circuit unit 100 (e.g., one of the target circuit units). The host system 11 may execute the corresponding control program after receiving the warning notification. In an embodiment, after receiving the warning notification, the host system 11 may issue a warning light signal (for example, through a light device of the host system 11)/a warning icon (for example, through a display of the host system 11)/a warning message (for example, through the display of the host system 11)/and a warning voice (for example, through the speaker of the host system 11) to prompt the user that the host system is currently under electromagnetic attack, and the storage device also enters a safety state. In addition, in an embodiment, the control circuit unit 100 may further control the storage device to enter a safety state or a read-only mode to prevent the storage device from writing new data, thereby preventing abnormality from being caused due to writing of wrong data. In the example of FIG. 1A, each local area has a detection circuit unit, but the disclosure is not limited thereto. In other embodiments, each local area may have more than one detection circuit unit.

Figure 1B:
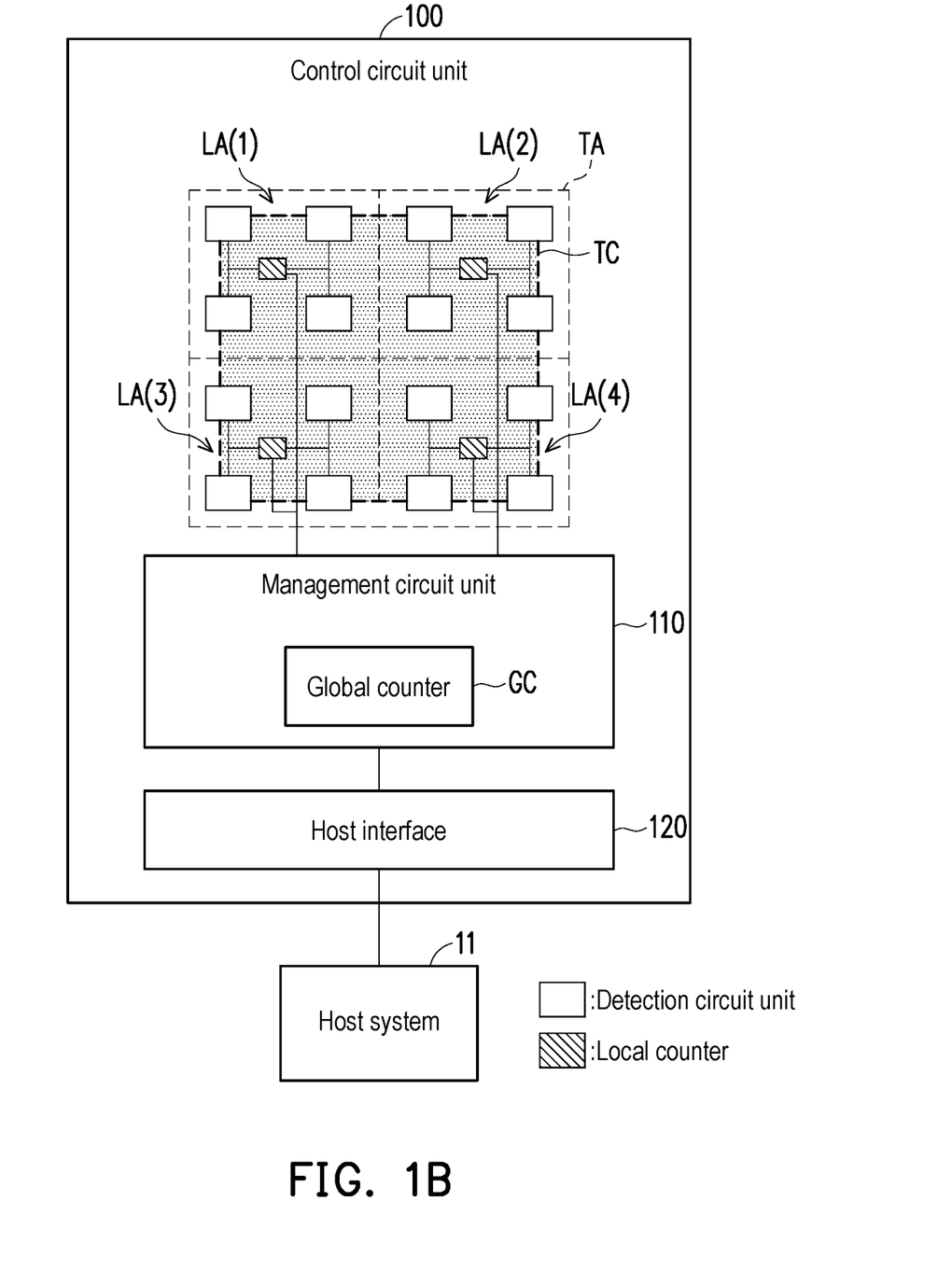
FIG. 1B is a block diagram of a control circuit unit according to another exemplary embodiment of the present disclosure.

FIG. 1B is a block diagram of a control circuit unit according to another exemplary embodiment of the present disclosure. Please refer to FIG. 1B. In the example of FIG. 1B, the local areas LA(1)~LA(4) each have four detection circuit units. The local counter corresponding to a local area is coupled to all detection circuit units in the local area. For example, the four detection circuit units of the local area LA(1) are all coupled to the same local counter corresponding to the local area LA(1).

It should be noted that the number of detection circuit units in each local area may be different. Each local area may also vary in size. In an exemplary embodiment, the detection circuit units are evenly distributed in the corresponding local area in a grid form.

In addition, the control circuit unit 100 may also have more than one target area. Specifically, the number of target areas may correspond to the number of target circuit units.

Figure 1C:
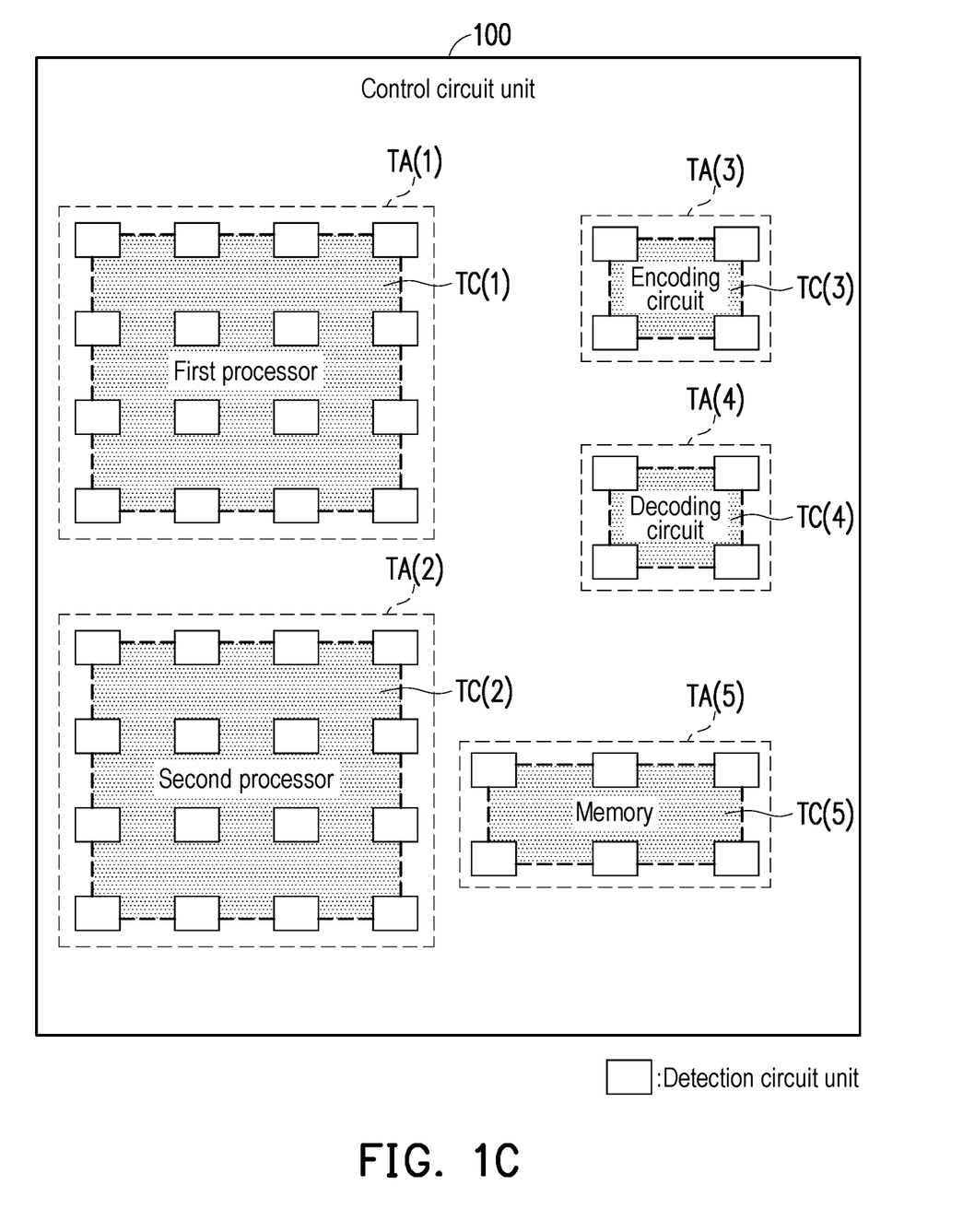
FIG. 1C is a layout diagram of a detection circuit unit according to an exemplary embodiment of the present disclosure.

FIG. 1C is a schematic layout diagram of a detection circuit unit according to an exemplary embodiment of the present disclosure. Please refer to FIG. 1C. In this example, the control circuit unit 100 includes a plurality of target circuit units TC (1)~TC (5). Correspondingly, the control circuit unit 100 has target areas TA (1)~TA (5) encompassing the target circuit units TC (1)~TC (5) respectively. The detection circuit units belonging to each target area are evenly arranged in the corresponding target area.

Figure 2A:
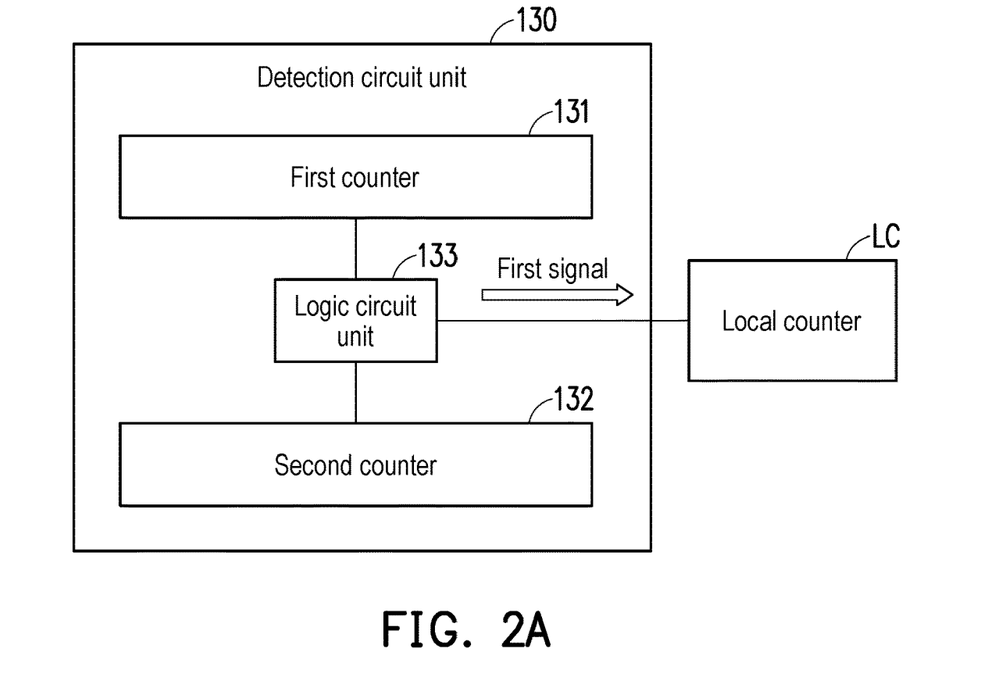
FIG. 2A is a block diagram of a detection circuit unit according to an exemplary embodiment of the present disclosure.

FIG. 2A is a block diagram of a detection circuit unit according to an exemplary embodiment of the present disclosure. Referring to FIG. 2A, each detection circuit unit 130 includes: a logic circuit unit 133, a first counter 131 and a second counter 132. The step of sending the first signal by the detection circuit unit 130 in response to a determination of receiving an electromagnetic attack includes: calculating a difference between a first count value and a second count value through the logic circuit unit 133; and in response to determining that the difference between the first count value and the second count value is not equal to a predetermined value, generating the first signal by the logic circuit unit 133 based on the determination of receiving the electromagnetic attack, and sending the first signal to the coupled local counter, wherein the first signal is sent to the local counter LC.

In more detail, the first counter continues to accumulate the first count value according to a predetermined frequency, and the second counter continues to accumulate the second count value according to the predetermined frequency, wherein when there is no electromagnetic attack, the difference between the first count value and the second count value is the predetermined value. Furthermore, in an embodiment, the initial difference between the first count value and the second count value is the predetermined value. The predetermined frequency is, for example, 1 GHZ. The first counter and the second counter may accumulate using a cyclic accumulation method. For example, when the accumulation reaches the maximum value, the count value is reset.

That is to say, the first counter and the second counter each accumulate the recorded count value at the same frequency, but at the same point in time, without external electromagnetic interference, the accumulation functions of the first counter and the second counter are normal, so that the difference between the first count value and the second count value recorded by each of the first counter and the second counter is equal to the set predetermined value. In this exemplary embodiment, the predetermined value is 1, but the disclosure is not limited thereto. For example, the predetermined value may be −1 or other non-zero integer.

Figure 2B:
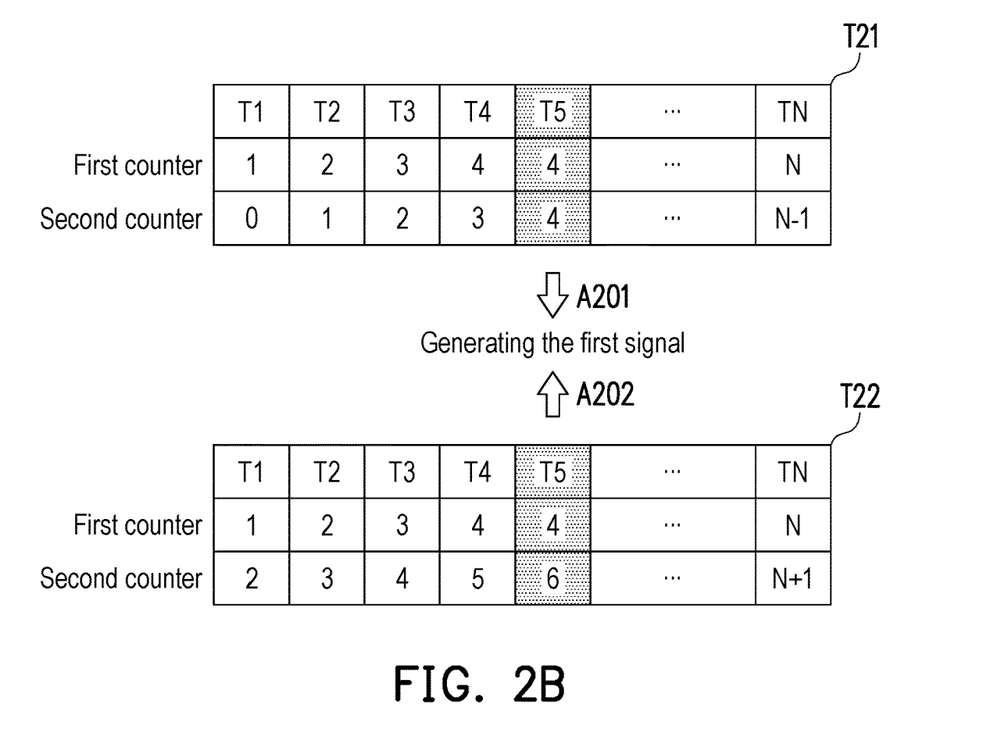
FIG. 2B is a schematic diagram of generating a first signal by comparing a first counter and a second counter according to an exemplary embodiment of the present disclosure.

FIG. 2B is a schematic diagram of generating the first signal by comparing the first counter and the second counter according to an exemplary embodiment of the present disclosure.

Please refer to Table T21 in FIG. 2B. Assume that the first counter 131 and the second counter 132 respectively accumulate the first count value and the second count value along with time points T1 to TN. Time points T1 to T4 are operations under normal conditions (that is, in absence of interference from electromagnetic energy). The predetermined value is the difference between the first count value minus the second count value, and is set to 1.

Assume that at time point T1 (e.g., initial time point), the first count value is 1 and the second count value is 0; at time point T2, the first count value is 2 and the second count value is 1; at time point T3, the first count value is 3 and the second count value is 2; at time point T4, the first count value is 4 and the second count value is 3. Under the circumstances, at time points T1 to T4, the differences calculated by the logic circuit unit 133 are all the predetermined value "1", and the logic circuit unit 133 determines that the first counter 131 and the second counter 132 are in a normal operating status and there is no electromagnetic interference (no electromagnetic attack).

It should be noted that, in an embodiment, the second counter only starts to accumulate the second count value from the time point T2 (that is, after the first counter starts counting for the first time at the time point T1), and the initial value is "1". In another embodiment, the second counter starts accumulating the second count value from the time point T1, but the initial value is "0", which is different from the initial value "1" of the first count value of the first counter. In this way, in the above embodiment, the difference between the first count value and the second count value may be maintained at the predetermined value "1".

Next, assume that at time point T5, the first count value is 4 (for example, the first counter is undergone interference and cannot normally accumulate the first count value), and the second count value is 4. Since the calculated difference value of the logic circuit unit 133 is 0, which is not the predetermined value "1", the logic circuit unit 133 determines that the first counter 131 and the second counter 132 are not in a normal operating state and have been affected by electromagnetic interference (under electromagnetic attack). Then, the logic circuit unit 133 generates a first signal (e.g., indicated by arrow A201).

In another example, assume that the predetermined value is set to "−1". As shown in Table T22, assume that at time point T1 (e.g., initial time point), the first count value is 1 and the second count value is 2; at time point T2, the first count value is 2 and the second count value is 3; at time point T3, the first count value is 3 and the second count value is 4; at time point T4, the first count value is 4 and the second count value is 5. In this case, at time points T1 to T4, the differences calculated by the logic circuit unit 133 are all predetermined values "−1", and the logic circuit unit 133 determines that the first counter 131 and the second counter 132 are in normal operating status without being affected by electromagnetic interference (no electromagnetic attack).

Next, assume that at time point T5, the first count value is 4 and the second count value is 6. Since the calculated difference value of the logic circuit unit 133 is "−2", which is not the predetermined value "−1", the logic circuit unit 133 determines that the first counter 131 and the second counter 132 are not in a normal operating status and is affected by electromagnetic interference (under electromagnetic attack). Then, the logic circuit unit 133 generates a first signal (e.g., indicated by arrow A202). The first signal may be received by the coupled local counter, and the local counter may increase the number of recorded localized attacks by one accordingly.

Figure 3:
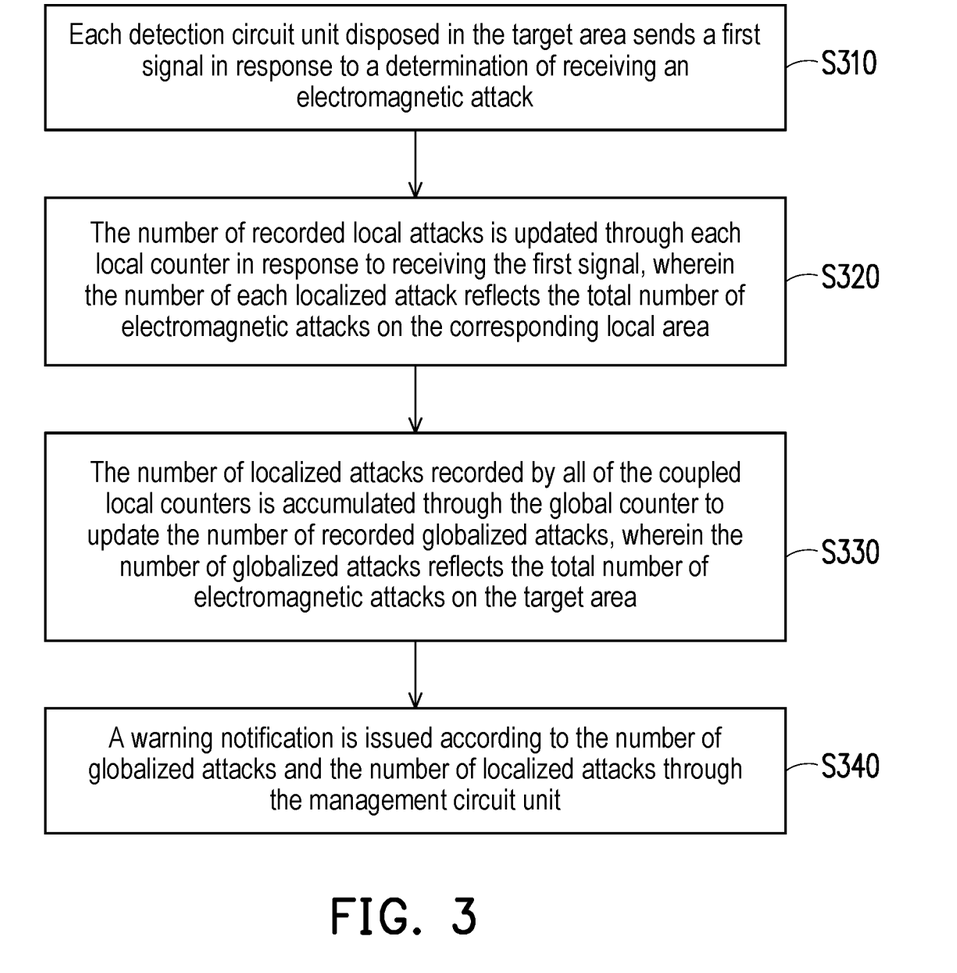
FIG. 3 is a flow chart of an electromagnetic detection method according to an exemplary embodiment of the present disclosure.

FIG. 3 is a flow chart of an electromagnetic detection method according to an exemplary embodiment of the present disclosure. Referring to FIG. 3, in step S310, each detection circuit unit disposed in the target area sends a first signal in response to a determination of receiving an electromagnetic attack. Next, in step S320, the number of recorded local attacks is updated through each local counter in response to receiving the first signal, wherein the number of each localized attack reflects the total number of electromagnetic attacks on the corresponding local area. Next, in step S330, the number of localized attacks recorded by all of the coupled local counters is accumulated through the global counter to update the number of recorded globalized attacks, wherein the number of globalized attacks reflects the total number of electromagnetic attacks on the target area.

Next, in step S340, a warning notification is issued according to the number of globalized attacks and the number of localized attacks through the management circuit unit.

In more detail, the step of issuing a warning notification by the management circuit unit according to the number of globalized attacks and the number of localized attacks includes: the management circuit unit continues to read the number of globalized attacks; in response to determining that the number of globalized attacks is greater than the first threshold, the management circuit unit obtains (e.g., reads) the number of localized attacks of each local counter during a preset monitoring period; in response to determining that all of values of the number of each localized attack are increased during the preset monitoring period, it is determined that the electromagnetic attack received is not an electromagnetic attack from an external hacker; in response to determining that not all of the values of the number of localized attacks are increased during the preset monitoring period, it is determined that the electromagnetic attack received is an electromagnetic attack from an external hacker, and the warning notification is generated.

That is to say, when it is determined that the electromagnetic attack received is directed at a local area of the control circuit unit, the management circuit unit will determine that the electromagnetic attack is man-made; when it is determined that the electromagnetic attack received is directed at all local areas of the control circuit unit, the management circuit unit will determine that the electromagnetic attack results from the natural environment and is not a man-made electromagnetic attack.

Figure 5:
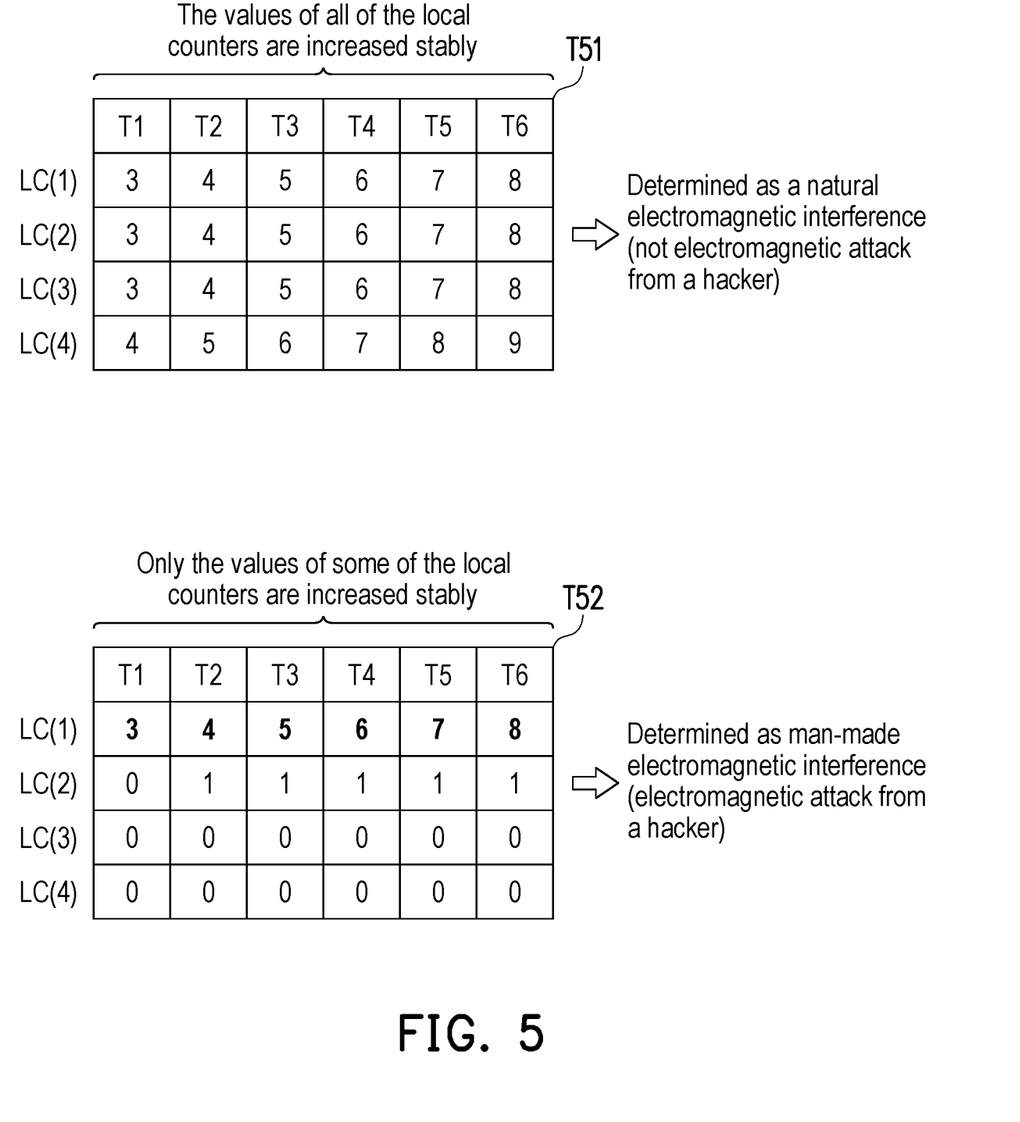
FIG. 5 is a schematic diagram of determining an electromagnetic attack from a hacker based on a local counter according to an exemplary embodiment of the present disclosure.

FIG. 5 is a schematic diagram of determining a hacker's electromagnetic attack based on a local counter according to an exemplary embodiment of the present disclosure. For example, please refer to FIG. 5. As shown in Table T51, assuming that the number of globalized attacks has exceeded the first threshold, the management circuit unit will start to inspect changes in the values of all local counters (number of localized attacks) during the monitoring period (for example, 6 units of time, T1~T6).

In this example, the number of localized attacks recorded by each of the local counters LC (1)~LC (4) slowly increases along with time points T1~T6. The management circuit unit will determine that the electromagnetic attack received is a globalized electromagnetic attack, which is more likely to be caused by external natural environmental electromagnetic energy, rather than man-made external electromagnetic interference (i.e., not an electromagnetic attack from a hacker). Under the circumstances, the management circuit unit will reset the global counter or/and the local counter. In another embodiment, the management circuit unit may also send a reminder notification to prompt that the current external environment contains electromagnetic energy that might affect the control circuit unit 100.

In another example, as shown in Table T52, assuming that the number of globalized attacks has exceeded the first threshold, the management circuit unit will start to inspect the changes in the values of all local counters (number of localized attacks) during the monitoring period (for example, 6 units of time, T1~T6).

In this example, only the number of localized attacks recorded by the local counter LC (1) slowly increases with time points T1~T6. The management circuit unit will determine that the electromagnetic attack received is a localized electromagnetic attack, which is highly likely caused by man-made electromagnetic energy. Under the circumstances, the management circuit unit will determine that the attack received is an electromagnetic attack from a hacker, and generate a warning notification. In an embodiment, after sending the warning notification, the management circuit unit may further reset the global counter or/and the local counter.

The global counter and the local counter may be accumulated using a cyclic accumulation method. For example, when the accumulation reaches a maximum value, the recorded value is reset.

It is worth mentioning that the control circuit unit and the plurality of detection circuit units provided in the above exemplary embodiments may be implemented through digital integrated circuits. For example, design and implementation are carried out through electronic design automation (EDA) software.

Figure 4:
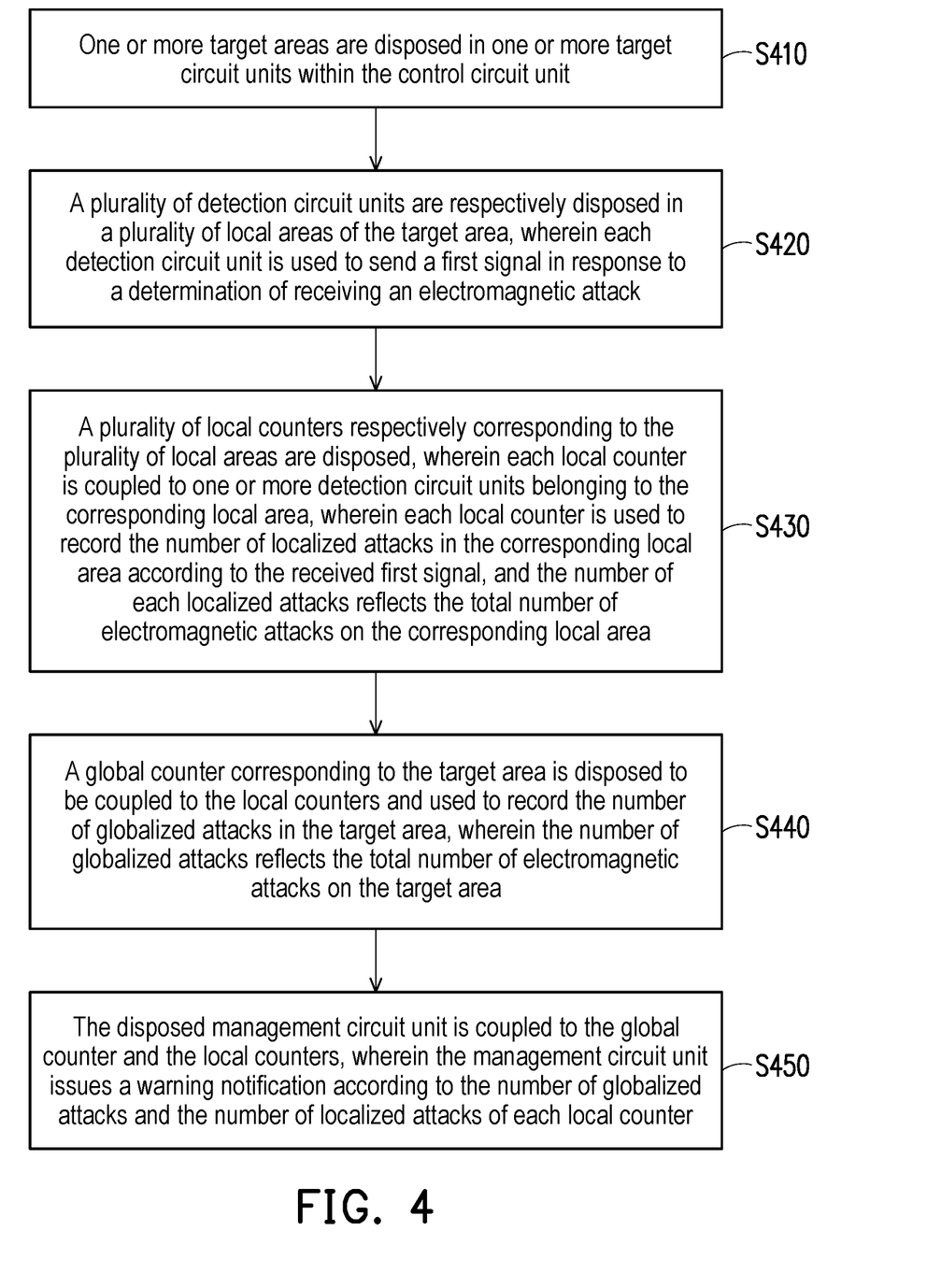
FIG. 4 is a flow chart of a digital circuit design method according to an exemplary embodiment of the present disclosure.

FIG. 4 is a flow chart of a digital circuit design method according to an exemplary embodiment of the present disclosure. Referring to FIG. 4, in step S410, one or more target areas are disposed in one or more target circuit units within the control circuit unit. In step S420, a plurality of detection circuit units are respectively disposed in a plurality of local areas of the target area, wherein each detection circuit unit is used to send a first signal in response to a determination of receiving an electromagnetic attack.

In step S430, a plurality of local counters respectively corresponding to the plurality of local areas are disposed, wherein each local counter is coupled to one or more detection circuit units belonging to the corresponding local area, wherein each local counter is used to record the number of localized attacks in the corresponding local area according to the received first signal, and the number of each localized attacks reflects the total number of electromagnetic attacks on the corresponding local area.

In step S440, a global counter corresponding to the target area is disposed to be coupled to the local counters and used to record the number of globalized attacks in the target area, wherein the number of globalized attacks reflects the total number of electromagnetic attacks on the target area.

In step S450, the disposed management circuit unit is coupled to the global counter and the local counters, wherein the management circuit unit issues a warning notification according to the number of globalized attacks and the number of localized attacks of each local counter.

In summary, the control circuit unit, electromagnetic detection method and digital circuit design method provided in this exemplary embodiment may effectively detect electromagnetic attacks through the designed control circuit unit, wherein the detection circuit unit disposed in the target area of the target circuit unit may detect the electromagnetic attack exerted on the target circuit unit, and then issue a warning notification accordingly. In this way, the host system may be immediately notified that the host system is currently under electromagnetic attack, so that the host system may perform security operations accordingly, thereby improving the security efficiency of the host system.

Although the disclosure has been disclosed as above with the embodiment, it is not intended to limit this disclosure. Anyone with ordinary knowledge in the technical field can make some changes and modifications without departing from the spirit and scope of the disclosure. Therefore, the scope of protection in the disclosure shall be determined by the scope of the appended claims.

What is claimed is:

1. A control circuit unit for detecting an electromagnetic attack, comprising:

one or more target circuit units;
a plurality of detection circuit units respectively disposed in a plurality of local areas of a target area within the control circuit unit, wherein the target area encompasses the one or more target circuit units, wherein the plurality of detection circuit units are disposed to send a first signal in response to a determination of receiving the electromagnetic attack;
a plurality of local counters respectively corresponding to the plurality of local areas, wherein the plurality of local counters are coupled to the plurality of detection circuit units belonging to the corresponding local areas, and update the number of recorded localized attacks in response to receiving the first signal, wherein the number of the localized attack reflects a total number of the electromagnetic attack on the corresponding local area;
a global counter corresponding to the target area and coupled to the plurality of local counters, and accumulating the number of the localized attacks to update the number of recorded globalized attacks, wherein the number of the globalized attacks reflects a total number of the electromagnetic attack on the target area; and
a management circuit unit coupled to the global counter and the plurality of local counters, wherein the management circuit unit issues a warning notification based on the number of the globalized attacks and the number of the localized attacks.

2. The control circuit unit according to claim 1, wherein the one or more target circuit units comprise at least one of the following: a processor, an encryption circuit, a decryption circuit, and a buffer memory.

3. The control circuit unit according to claim 1, wherein the plurality of detection circuit units are implemented through digital integrated circuits.

4. The control circuit unit according to claim 1, wherein each of the plurality of detection circuit units comprises: a logic circuit unit, a first counter and a second counter, wherein the step of sending the first signal in response to the determination of receiving the electromagnetic attack comprises:
calculating a difference between a first count value and a second count value through the logic circuit unit; and
in response to determining that the difference between the first count value and the second count value is not equal to a predetermined value, generating the first signal by the logic circuit unit based on the determination of receiving the electromagnetic attack, and sending the first signal to the coupled local counter.

5. The control circuit unit according to claim 4, wherein the first counter continues to accumulate the first count value according to a predetermined frequency, and the second counter continues to accumulate the second count value according to the predetermined frequency, wherein if the electromagnetic attack is not received, the difference between the first count value and the second count value is the predetermined value, wherein an initial difference between the first count value and the second count value is the predetermined value, and the predetermined value is 1.

6. The control circuit unit according to claim 1, wherein the management circuit unit issues the warning notification to a host system coupled to the control circuit unit or a processor of the control circuit unit.

7. The control circuit unit according to claim 1, wherein the step of issuing the warning notification by the management circuit unit according to the number of the globalized attacks and the number of the localized attacks comprises:
the management circuit unit continues to read the number of the globalized attacks;
in response to determining that the number of the globalized attacks is greater than a first threshold, the management circuit unit obtains the number of each of the localized attacks during a preset monitoring period;
in response to determining that all of values of the number of each of the localized attacks are increased during the preset monitoring period, it is determined that the electromagnetic attack received is not an electromagnetic attack from an external hacker;
in response to determining that not all of the values of the number of each of the localized attacks are increased during the preset monitoring period, it is determined that the electromagnetic attack received is the electromagnetic attack from the external hacker, and the warning notification is generated.

8. The control circuit unit according to claim 1, wherein the plurality of detection circuit units are evenly distributed in the plurality of local areas in a grid form.

9. An electromagnetic detection method for detecting an electromagnetic attack and adaptable for a control circuit unit, wherein the control circuit unit comprises: one or more target circuit units, a plurality of detection circuit units, a plurality of local counters, a global counter, and a management circuit unit, wherein the plurality of detection circuit units are respectively disposed in a plurality of local areas of a target area within the control circuit unit, wherein the target area encompasses the one or more target circuit units, wherein the plurality of local counters are coupled to the plurality of detection circuit units belonging to the corresponding local areas, wherein the global counter is coupled to the plurality of local counters, wherein the management circuit unit is coupled to the global counter and the plurality of local counters, and the method comprising:
sending a first signal through each of the plurality of detection circuit units in response to a determination of receiving the electromagnetic attack;
updating the number of recorded localized attacks through each of the plurality of local counters in response to receiving the first signal, wherein the number of each of the localized attacks reflects a total number of the electromagnetic attack on the corresponding local area;
accumulating the number of the localized attacks through the global counter to update the number of recorded globalized attacks, wherein the number of the globalized attacks reflects a total number of the electromagnetic attack on the target area; and
issuing a warning notification through the management circuit unit based on the number of the globalized attacks and the number of the localized attacks.

10. The electromagnetic detection method according to claim 9, wherein the one or more target circuit units comprise at least one of the following: a processor, an encryption circuit, a decryption circuit, and a buffer memory.

11. The electromagnetic detection method according to claim 9, wherein the plurality of detection circuit units are implemented through digital integrated circuits.

12. The electromagnetic detection method according to claim 9, wherein each of the plurality of detection circuit units comprises: a logic circuit unit, a first counter and a second counter, wherein the step of sending the first signal in response to the determination of receiving the electromagnetic attack comprises:
calculating a difference between a first count value and a second count value through the logic circuit unit; and in response to determining that the difference between the first count value and the second count value is not equal to a predetermined value, generating the first signal by the logic circuit unit based on the determination of receiving the electromagnetic attack, and sending the first signal to the coupled local counter.

13. The electromagnetic detection method according to claim 12, wherein the first counter continues to accumulate the first count value according to a predetermined frequency, and the second counter continues to accumulate the second count value according to the predetermined frequency, wherein if the electromagnetic attack is not received, the difference between the first count value and the second count value is the predetermined value, wherein an initial difference between the first count value and the second count value is the predetermined value, and the predetermined value is 1.

14. The electromagnetic detection method according to claim 9, wherein the management circuit unit issues the warning notification to a host system coupled to the control circuit unit or a processor of the control circuit unit.

15. The electromagnetic detection method according to claim 9, wherein the step of issuing the warning notification by the management circuit unit according to the number of the globalized attacks and the number of the localized attacks comprises:
the management circuit unit continues to read the number of the globalized attacks;
in response to determining that the number of the globalized attacks is greater than a first threshold, the management circuit unit obtains the number of each of the localized attacks during a preset monitoring period;
in response to determining that all of values of the number of each of the localized attacks are increased during the preset monitoring period, it is determined that the electromagnetic attack received is not an electromagnetic attack from an external hacker;
in response to determining that not all of the values of the number of each of the localized attacks are increased during the preset monitoring period, it is determined that the electromagnetic attack received is the electromagnetic attack from the external hacker, and the warning notification is generated.

16. The electromagnetic detection method according to claim 9, wherein the plurality of detection circuit units are evenly distributed in the plurality of local areas in a grid form.

17. A digital circuit design method adaptable for designing a control circuit unit for detecting an electromagnetic attack, the method comprising:
disposing one or more target areas in one or more target circuit units within a control circuit unit;
disposing a plurality of detection circuit units respectively in a plurality of local areas of the target area, wherein each of the plurality of detection circuit units is disposed to send a first signal in response to a determination of receiving the electromagnetic attack;
disposing a plurality of local counters respectively corresponding to the plurality of local areas, wherein each of the plurality of local counters is coupled to the plurality of detection circuit units belonging to the corresponding local areas, wherein each of the plurality of local counter is disposed to record the number of localized attacks in the corresponding local area according to the received first signal, wherein the number of each of the localized attacks reflects a total number of the electromagnetic attack on the corresponding local area;
disposing a global counter corresponding to the target area so as to be coupled to the plurality of local counters and to record the number of globalized attacks of the target area, wherein the number of the globalized attacks reflects a total number of the electromagnetic attack on the target area; and
disposing a management circuit unit coupled to the global counter and the plurality of local counters, wherein the management circuit unit issues a warning notification based on the number of the globalized attacks and the number of the localized attacks.

18. The digital circuit design method according to claim 17, wherein the one or more target circuit units comprise at least one of the following: a processor, an encryption circuit, a decryption circuit, and a buffer memory.

19. The digital circuit design method according to claim 17, wherein each of the plurality of detection circuit units comprises: a logic circuit unit, a first counter and a second counter,
wherein the logic circuit unit calculates a difference between a first count value and a second count value,
wherein in response to determining that the difference between the first count value and the second count value is not equal to a predetermined value, generating the first signal by the logic circuit unit based on the determination of receiving the electromagnetic attack, and sending the first signal to the coupled local counter.

20. The digital circuit design method according to claim 19, wherein the first counter continues to accumulate the first count value according to a predetermined frequency, and the second counter continues to accumulate the second count value according to the predetermined frequency, wherein if the electromagnetic attack is not received, the difference between the first count value and the second count value is the predetermined value, wherein an initial difference between the first count value and the second count value is the predetermined value, and the predetermined value is 1.

21. The digital circuit design method according to claim 17, wherein the management circuit unit issues the warning notification to a host system coupled to the control circuit unit or a processor of the control circuit unit.

22. The digital circuit design method according to claim 17, wherein the management circuit unit continues to read the number of the globalized attacks;
wherein in response to determining that the number of the globalized attacks is greater than a first threshold, the management circuit unit obtains the number of each of the localized attacks during a preset monitoring period,
wherein in response to determining that all of values of the number of each of the localized attacks are increased during the preset monitoring period, it is determined that the electromagnetic attack received is not an electromagnetic attack from an external hacker,
wherein in response to determining that not all of the values of the number of each of the localized attacks are increased during the preset monitoring period, it is determined that the electromagnetic attack received is the electromagnetic attack from the external hacker, and the warning notification is generated.

23. The digital circuit design method according to claim 17, wherein the plurality of detection circuit units are evenly distributed in the plurality of local areas in a grid form.

* * * * *